(12) United States Patent
Hiremath

(10) Patent No.: US 9,119,224 B2
(45) Date of Patent: Aug. 25, 2015

(54) WIRELESS DEVICE WITH WLAN AND WPAN COMMUNICATION CAPABILITIES

(71) Applicant: GainSpan Corporation, San Jose, CA (US)

(72) Inventor: Indudharswamy G Hiremath, Bangalore (IN)

(73) Assignee: GAINSPAN CORPORATION, San Jose, CA (US)

( * ) Notice: Subject to any disclaimer, the term of this patent is extended or adjusted under 35 U.S.C. 154(b) by 0 days.

(21) Appl. No.: 14/527,793

(22) Filed: Oct. 30, 2014

(65) Prior Publication Data

US 2015/0050960 A1 Feb. 19, 2015

Related U.S. Application Data

(63) Continuation of application No. 13/848,731, filed on Mar. 22, 2013, now Pat. No. 8,902,923.

(51) Int. Cl.
*H04W 88/06* (2009.01)
*H04W 4/00* (2009.01)
*H04B 1/403* (2015.01)
*H04W 84/12* (2009.01)

(52) U.S. Cl.
CPC .............. *H04W 88/06* (2013.01); *H04W 4/008* (2013.01); *H04B 1/406* (2013.01); *H04W 84/12* (2013.01)

(58) Field of Classification Search
None
See application file for complete search history.

(56) References Cited

U.S. PATENT DOCUMENTS

| 7,702,357 | B2 | 4/2010 | Yam | |
|---|---|---|---|---|
| 2004/0116075 | A1* | 6/2004 | Shoemake et al. | 455/41.2 |
| 2005/0078624 | A1 | 4/2005 | Shu et al. | |
| 2006/0068777 | A1 | 3/2006 | Sadowsky et al. | |
| 2006/0133415 | A1* | 6/2006 | Mueller | 370/466 |
| 2006/0227753 | A1* | 10/2006 | Vleugels et al. | 370/338 |
| 2007/0010248 | A1* | 1/2007 | Dravida et al. | 455/435.1 |
| 2007/0189256 | A1* | 8/2007 | Oh | 370/338 |
| 2007/0281617 | A1 | 12/2007 | Meylan et al. | |
| 2008/0205365 | A1* | 8/2008 | Russell et al. | 370/341 |
| 2008/0287068 | A1 | 11/2008 | Etemad | |
| 2009/0245221 | A1 | 10/2009 | Piipponen | |
| 2010/0091715 | A1* | 4/2010 | Akchurin et al. | 370/329 |
| 2010/0150116 | A1* | 6/2010 | Ji et al. | 370/338 |
| 2010/0165962 | A1* | 7/2010 | Tzoreff et al. | 370/338 |

(Continued)

FOREIGN PATENT DOCUMENTS

EP 2101535 A1 9/2009

OTHER PUBLICATIONS

Carlos De M. Cordeiro, Sachin Abhyankar, Rishi Toshiwal, and Dharma P. Agrawal, A Novel Architecture and Coexistence Method to Provide Global Access to/from Bluetooth WPANs by IEEE 802.11 WLANs, pp. 1-8.

(Continued)

*Primary Examiner* — Kerri Rose
(74) *Attorney, Agent, or Firm* — Iphorizons PLLC; Narendra Reddy Thappeta

(57) ABSTRACT

A wireless device which operates according to a first protocol specification in active durations specified by the first protocol, and according to a second protocol specification in the idle durations specified by the first protocol specification. In an embodiment, the first protocol specification corresponds to IEEE 802.15.4 standard and the second protocol specification corresponds to IEEE 802.11 family of standards.

14 Claims, 7 Drawing Sheets

(56) References Cited

U.S. PATENT DOCUMENTS

| | | | |
|---|---|---|---|
| 2010/0226342 A1* | 9/2010 | Colling et al. | 370/336 |
| 2010/0278062 A1 | 11/2010 | Abraham et al. | |
| 2010/0303008 A1* | 12/2010 | Wietfeldt et al. | 370/328 |
| 2011/0255455 A1 | 10/2011 | Seok | |
| 2013/0051375 A1* | 2/2013 | Chemishkian et al. | 370/338 |
| 2013/0235814 A1* | 9/2013 | Wietfeldt et al. | 370/329 |
| 2014/0153489 A1* | 6/2014 | Perras et al. | 370/328 |

OTHER PUBLICATIONS

Multi-band WLAN management, http://ip.com/IPCOM/000188555, Downloaded circa Dec. 21, 2012, pp. 1-1.
DrayTek, http://www.draytek.com/user/PdInfoDetail.php?Id=93, Downloaded circa Dec. 21, 2012, pp. 1-2.
Wireless N 300 Multi-Function Access Point with 5-Port Switch, http://airlink101.com/download/download_links/m-ap671w.pdf, pp. 1-56.
Per Magnus Østhus, Concurrent operation of Bluetooth low energy and ANT wireless protocols with an embedded controller, Date Jun. 2011, pp. 1-134.
S. Simoens et al., "The Evolution of 5GHz WLAN Toward Higher Throughputs," IEEE Wireless Commun., vol. 10, No. 6, Dec. 2003, pp. 6-13.
C. Heegard et al., "High-Performance Wireless Ethernet," IEEE Commun. Mag., vol. 39, No. 11, Nov. 2001, pp. 64-73.
G. Bianchi, "Performance Analysis of the IEEE 802.11 Distributed Coordination Function," IEEE JSAC, vol. 18, No. 3, Mar. 2000, pp. 535-547.
M.Heusse et al., "Performance Anomaly of 802.11b," Proc. IEEE INFOCOM, San Francisco, CA, Apr. 2003.
Dimitris Vassis, George Kormentzas, Angelos Rouskas, and Ilias Maglogiannis, The IEEE 802.11g Standard for High Data Rate WLANs, IEEE Network May/Jun. 2005, pp. 21-26.
Demystifying 802.15.4 and ZigBee, www.digi.com, Downloaded circa Mar. 4, 2013, pp. 1-5.
Dusan Stevanovic, IEEE 802.15.4 standard, date Jun. 20, 2007, pp. 1-49.

* cited by examiner

WIRELESS DEVICE WITH WLAN AND WPAN COMMUNICATION CAPABILITIES

RELATED APPLICATIONS

The present application is a continuation of and claims priority from co-pending U.S. Non-provisional patent application entitled, "WIRELESS DEVICE WITH WLAN AND WPAN COMMUNICATION CAPABILITIES", application Ser. No. 13/848,731, filed on 22 Mar. 2013, and is incorporated in its entirety herewith.

BACKGROUND OF THE INVENTION

1. Technical Field

Embodiments of the present disclosure relate generally to wireless networks, and more specifically to wireless device with WLAN and WPAN communication capabilities.

2. Related Art

A wireless device refers to a device which communicates with other devices/systems over a wireless medium. There are various wireless standard specifications (and corresponding communication technologies), designed for different requirements suitable for corresponding environments. A standard specification refers to a comprehensive set of required/optional protocol/electrical characteristics that devices are to follow for sharing the wireless medium and transmission of data packets.

WLAN (Wireless Local Area Network) is one such example of a communication standard defined by IEEE 802.11 specifications, as is well known in the relevant arts. As is also well known in the relevant arts, WLAN technology permits relatively high data transfer rates (e.g., or the order of few megabits per second) over distances of the ranges of a few meters.

WPAN (Wireless Personal Area Network) is another example of communication standard defined by IEEE 802.15.4 specification. As is well known, WPAN technology permits relatively lower data rates compared to WLAN.

BRIEF DESCRIPTION OF THE VIEWS OF DRAWINGS

Example embodiments of the present invention will be described with reference to the accompanying drawings briefly described below.

The drawing in which an element first appears is indicated by the leftmost digit(s) in the corresponding reference number.

DETAILED DESCRIPTION

1. Overview

A wireless device provided according to an aspect of the present invention operates according to a first protocol specification in active durations specified by the first protocol, and according to a second protocol specification in the idle durations specified by the first protocol specification. In an embodiment, the first protocol specification corresponds to IEEE 802.15.4 standard and the second protocol specification corresponds to IEEE 802.11 family of standards.

Several aspects of the invention are described below with reference to examples for illustration. It should be understood that numerous specific details, relationships, and methods are set forth to provide a full understanding of the invention. One skilled in the relevant arts, however, will readily recognize that the invention can be practiced without one or more of the specific details, or with other methods, etc. In other instances, well-known structures or operations are not shown in detail to avoid obscuring the features of the invention.

2. Example Environment

Figure 1:
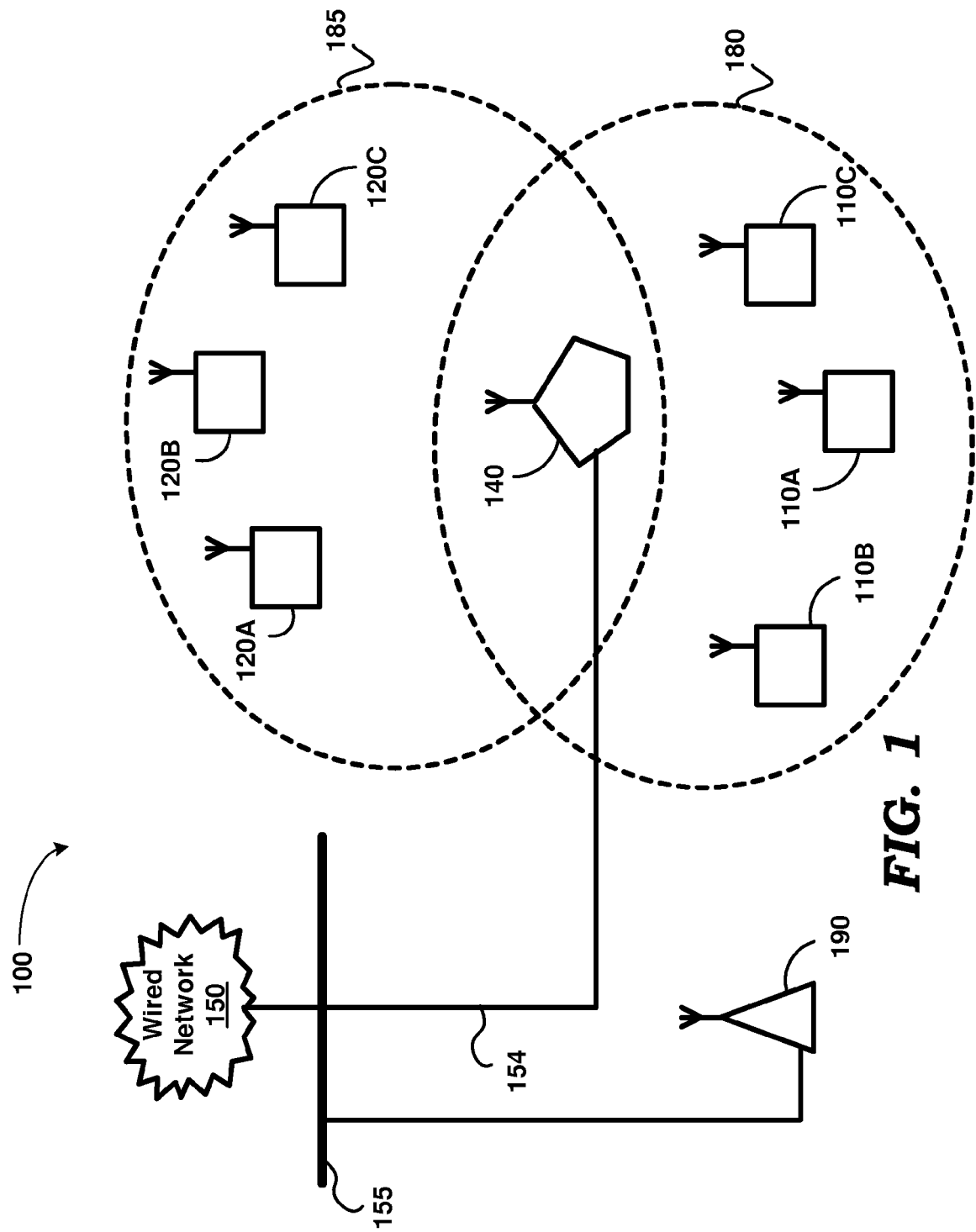
FIG. 1 is a block diagram of an example environment in which several features of the present invention can be implemented.

FIG. 1 is a block diagram representing an example environment in which several aspects of the present disclosure can be implemented. The example environment is shown containing only representative systems for illustration. However, real-world environments may contain many more systems/components as will be apparent to one skilled in the relevant arts.

Computing system 100 of FIG. 1 is shown containing wireless device 140, WLAN wireless stations 110A-110C, access point (AP) 190, WPAN nodes 120A-120C, wired network backbone 155 and wired network 150. Block 180 represents a basic service set (BSS) consistent with the IEEE 802.11 standard(s). Other environments may include more than one BSS, with the BSSs being interconnected to form an extended service set (ESS) consistent with IEEE 802.11 standards.

Each of WLAN wireless stations 110A-110C is designed to operate consistent with IEEE 802.11 standard, and may communicate with wireless device 140 (as well as with each other) wirelessly according to any of the family of IEEE 802.11 protocols (including as specified in IEEE 802.11a, 802.11b, 802.11g and 802.11n), and also with wired network 150 via wireless device 140. WLAN wireless stations 110A-110C may correspond, for example, to a laptop computer, smart phone, or a wireless sensor.

Each of WPAN nodes 120A-120C is designed to operate consistent with IEEE 802.15.4 standard, and may communicate with each other and with wired network 150 via wireless device 140. WPAN nodes may correspond, for example, to low data rate devices such as an RFID tag, smart energy meters, lighting controls, smart plugs, wireless sensor, etc. All nodes in block 185 operate consistent with WPAN technology.

Wireless device 140 is connected by a wired medium (154) to wired network backbone 155 and thus to wired network 150. Wired network 150 may represent the World Wide Web or internet. According to an aspect of the present disclosure, wireless device 140 is designed to enable the communication noted above with respect to WLAN wireless stations and WPAN nodes, as described next.

3. Wireless Device Operation

Figure 2:
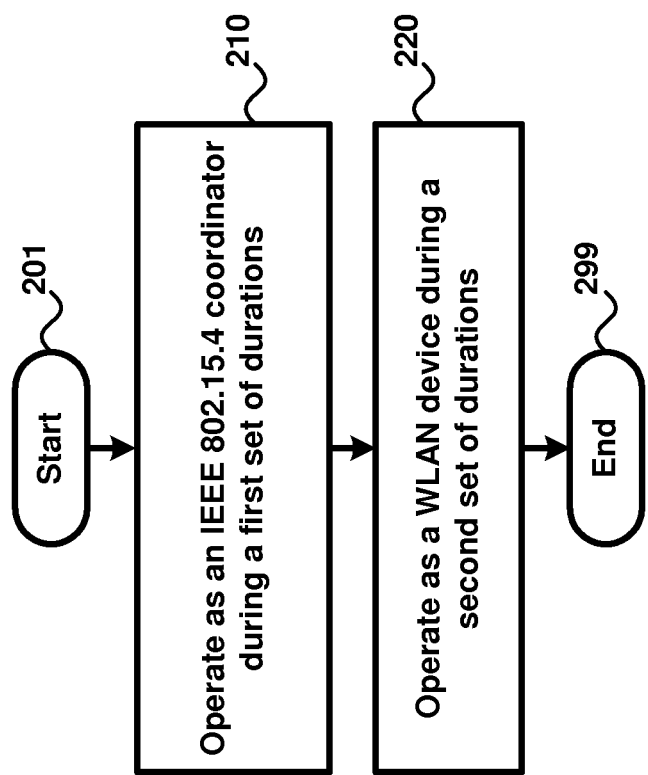
FIG. 2 is a flowchart illustrating operation of a wireless device, in an embodiment.

FIG. 2 is a flowchart illustrating operation of wireless device, in an embodiment. The flowchart is described with respect to the environment of FIG. 1, and in relation to wireless device 140, merely for illustration. However, various features described herein can be implemented in other environments and using other components as well, as will be apparent to one skilled in the relevant arts by reading the disclosure provided herein. Further, the steps in the flowchart are described in a specific sequence merely for illustration. Alternative embodiments using a different sequence of steps can also be implemented without departing from the scope and spirit of several aspects of the present invention, as will be apparent to one skilled in the relevant arts by reading the disclosure provided herein. The flowchart starts in step 201, in which control passes immediately to step 210.

In step 210, wireless device 140 operates as an IEEE 802.15.4 coordinator during a first set of durations. As is well known in the relevant arts, an IEEE 802.15.4 coordinator operates as a switch or gateway to receive packets from one node of the WPAN 185, and forward each packet to corresponding destination node(s) over the shared wireless medium. To coordinate the use of the shared medium, the coordinator transmits beacons periodically, with the beacons (among other functions) signaling the presence of the IEEE 802.15.4 coordinator to WPAN nodes 120A-120C, as well as providing timing synchronization and configuration information to WPAN nodes 120A-120C. Control then passes to step 220.

In step 220, wireless device 140 operates as a WLAN device during a second set of durations. The term 'WLAN device' refers to either an access point (AP) or a WLAN wireless station according to IEEE 802.11 standards. When wireless device 140 is designed to operate as an AP in the second set of intervals, wireless device 140 may transmit beacons (according to IEEE 802.11), and enable communication of WLAN wireless stations among themselves and/or with wired network 150. When wireless device 140 is designed to operate as a WLAN wireless station in the second set of intervals, wireless device 140 may listen to (receive) beacon transmissions from another AP (e.g., AP 190 of FIG. 1), exchange data with AP 190 and with other WLAN wireless stations (not shown) associated with AP 190. Control then passes to step 299, in which the flowchart ends.

The operations of the steps of the flowchart of FIG. 2 are illustrated next with example timing diagrams.

4. Timing Diagram

Figure 3:
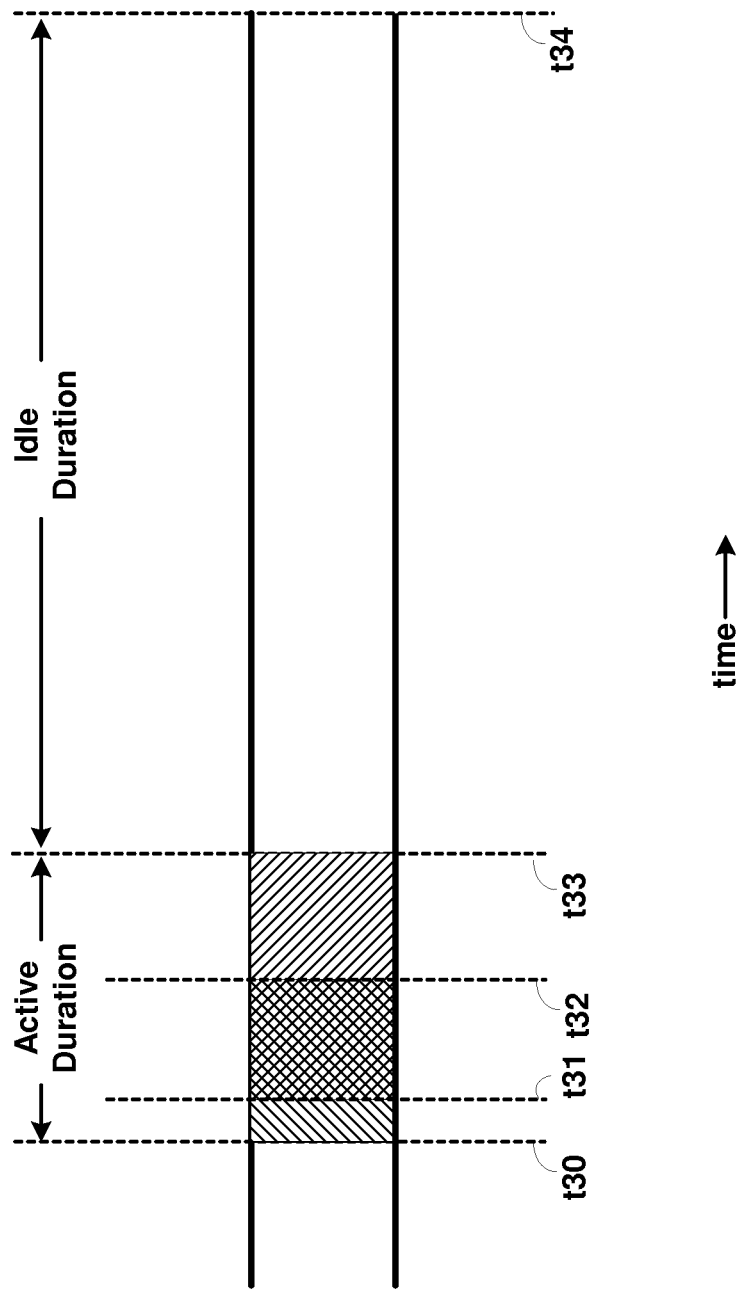
FIG. 3 is a timing diagram illustrating the operation of a wireless device that provides WLAN and WPAN communication capabilities, in an embodiment.

FIG. 3 is a timing diagram illustrating the operation of a wireless device that provides WLAN and WPAN communication capabilities, in an embodiment. In FIG. 3, interval t30-t34 (time between commencement of successive beacons) represents one beacon interval (BI) in the beacon-enabled network mode of operation according to IEEE 802.15.4/WPAN, and is divided into an active duration (active part or "Superframe") and an idle duration (inactive part). As is well known in the relevant arts, WPAN standard requires that all participating active/transmitting entities (nodes and coordinator included) of a WPAN refrain from transmission in the idle duration, and such idle duration can be used by all the entities to operate in power-savings state (to reduce power consumption). Thus, WPAN standard specifies that the entities can transmit only in the active duration of a beacon interval in the beacon-enabled network mode of operation. Beacon-enabled network mode of operation is defined in section 3.1 (beacon-enabled personal area network (PAN)) of the IEEE 802.15.4 standard as a PAN in which all coordinators emit regular beacons. Beacon-enabled network mode is further described in section 4.5.2 and section 4.5.4.1 of the IEEE 802.15.4 standard.

As described below in further detail, wireless device 140 operates an IEEE 802.15.4 coordinator (coordinator 140) during the active duration, and as a WLAN device (AP or station) during the idle duration.

The active duration (t30-t33) is shown containing three intervals, namely t30-t31, t31-t32 and t32-t33. At t30, wireless device 140 commences operation as an IEEE 802.15.4 coordinator and transmits a beacon in interval t30-t31. As noted above, the beacon may contain timing synchronization information (e.g., current time) as well as other information, such as configuration information, to enable WPAN nodes 120A-120C to communicate according to IEEE 802.15.4 standard.

Interval t31-t32 is a contention access period (CAP), in which WPAN nodes 120A-120C contend for access to the wireless medium for transmitting data to and receive data from coordinator 140. The specific access mechanism may be according to CSMA-CA (Carrier Sense Multiple Access—with Collision Avoidance) as specified by the IEEE 802.15.4 standard. Once access is obtained to the wireless medium, the corresponding node(s) 120A-120C may communicate with coordinator 140 to exchange data and/or other control bits/frames.

Interval t32-t33 is a contention-free period (CFP), in which corresponding confirmed/dedicated time slots for communication between coordinator 140 and corresponding ones of WPAN nodes 120A-120C is provided. The number of such dedicated time slots within interval t32-t33 may be multiple, and which slot is meant for which specific one of WPAN nodes 120A-120C may be specified in the beacon (t30-t31) by coordinator 140. The corresponding ones of WPAN nodes may exchange data packets with coordinator 140 in interval t32-t33.

Figure 4:
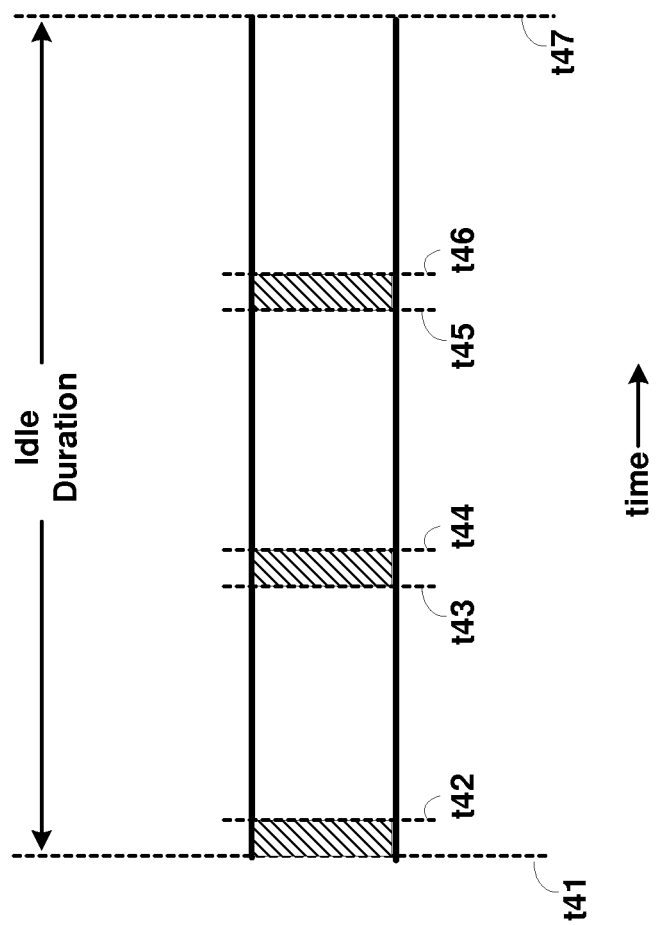
FIG. 4 is a timing diagram illustrating the operation of a wireless device as an access point in idle portions of an IEEE 802.15.4 beacon interval, in an embodiment.

At time instant t33 wireless device 140 switches to operation as a WLAN device, and may continue operation as a WLAN device till time instant t34. At time instant t34, wireless device 140 switches to operation as a coordinator (coordinator 140), and another IEEE 802.15.4 beacon interval (BI) commences, with corresponding active durations and idle durations. The beacon intervals may repeat, with wireless device 140 operating as a coordinator in the active durations (second set of durations) of the beacon intervals, and as a WLAN device in the idle durations (first set of durations) of the beacon intervals. During idle durations, WPAN nodes may operate in powered-down FIG. 4 shows a timing diagram illustrating the operations of wireless device 140 when operating as an AP (AP 140) in idle durations of an IEEE 802.15.4 beacon interval. Time interval t41-t47 equals the idle duration of the IEEE 802.15.4 beacon interval. Time instant t41 corresponds to time instant t33 of FIG. 3, while time instant t47 corresponds to t34. AP 140 is shown as transmitting WLAN beacons in intervals t41-t42, t43-t44 and t45-t46. In time intervals, t42-t43, t44-t45 and t46-t47. AP 140 may exchange (transmit/receive) data with WLAN wireless devices 110A-110C.

The IEEE 802.15.4 standard specifies a range of 15.36 milliseconds (ms) to 250 seconds (s) for an IEEE 802.15.4 beacon interval. The specific length of the beacon interval is programmable, may be chosen based on specific considerations or requirements. For example, the typical WLAN beacon interval is around 100 ms. Hence it may be desired to maintain the durations of the active durations to be less than 100 ms, thereby ensuring that AP 140 transmits a beacon every 100 ms. In general, it may be desirable to select the active duration to be less than the typical WLAN beacon interval. In an embodiment, IEEE 802.15.4 beacon interval is selected to be 500 ms, with the superframe duration being 50 ms, the idle interval thus being 450 ms.

Figure 5:
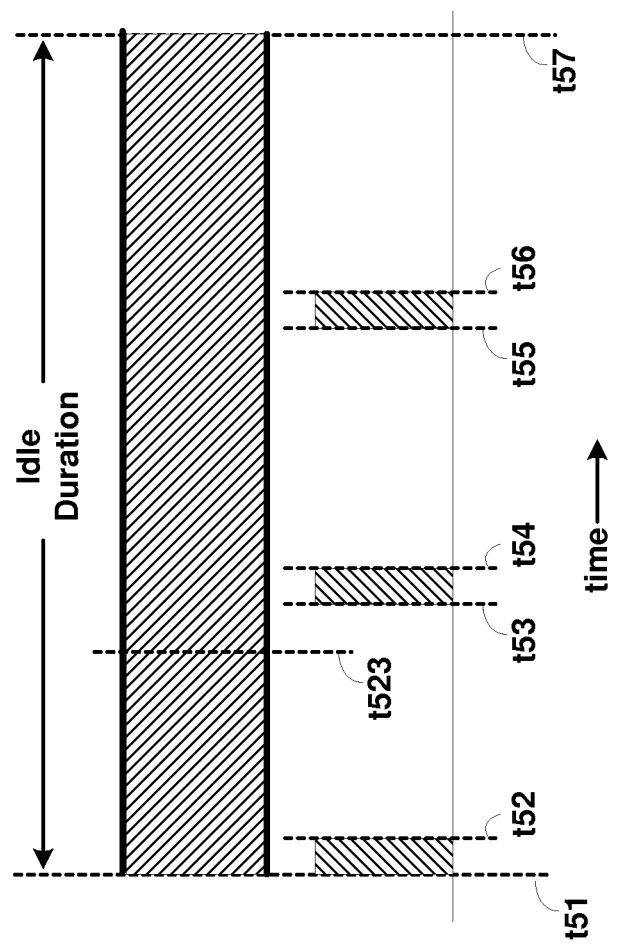
FIG. 5 is a timing diagram illustrating the operation of a wireless device as a WLAN station in idle portions of an IEEE 802.15.4 beacon interval, in an embodiment.

FIG. 5 shows a timing diagram illustrating the operations of wireless device 140 when operating as a WLAN station (station 140) in idle durations of an IEEE 802.15.4 beacon interval. Time interval t51-t57 equals the idle duration of an IEEE 802.15.4 beacon interval. Time instant t51 corresponds to time instant t33 of FIG. 3, while time instant t57 corresponds to t34. Station 140 is shown as being in a power-ON state in interval t51-t57, station 140 entering a power-down/low-power state at t57.

Each node/wireless station consumes more power (per unit duration) in the power-ON state, compared to that in the power-down state. Such difference in consumption may be obtained by having the transmitter turned on and off in the power-ON and power-down states respectively. Other components such as processors may also be turned off in the power-down state, for further power reduction.

In the power-ON state, station 140 may receive WLAN beacon transmissions from another AP (e.g., AP 190). Beacon transmissions of AP 190 are represented by intervals t51-t52, t53-t54 and t55-t56 in FIG. 5. Station 140 may exchange (transmit/receive) data packets with AP 190 in intervals t52-t53, t54-t55 and t56-t57. In other embodiments, station 140 may be in a power-ON duration for only a portion (e.g., t51-t523) of the idle duration, and may thus be available for receiving only the WLAN beacon of interval t51-t52, and exchanging data with AP 190 only in interval t52-t523.

The specific timing (duration, start and stop instants, length of active and idle durations, etc.) of an IEEE 802.15.4 beacon interval are effected by software instructions (operating in combination with corresponding hardware blocks) executed in wireless device 140, as described in greater detail in sections below.

In another embodiment, wireless device 140 operates as AP 140 in some idle durations, and as station 140 in other idle durations, while operating as a coordinator in all active durations.

The block-level implementation details of wireless device 140 in an embodiment are described next.

5. Wireless Device

Figure 6:
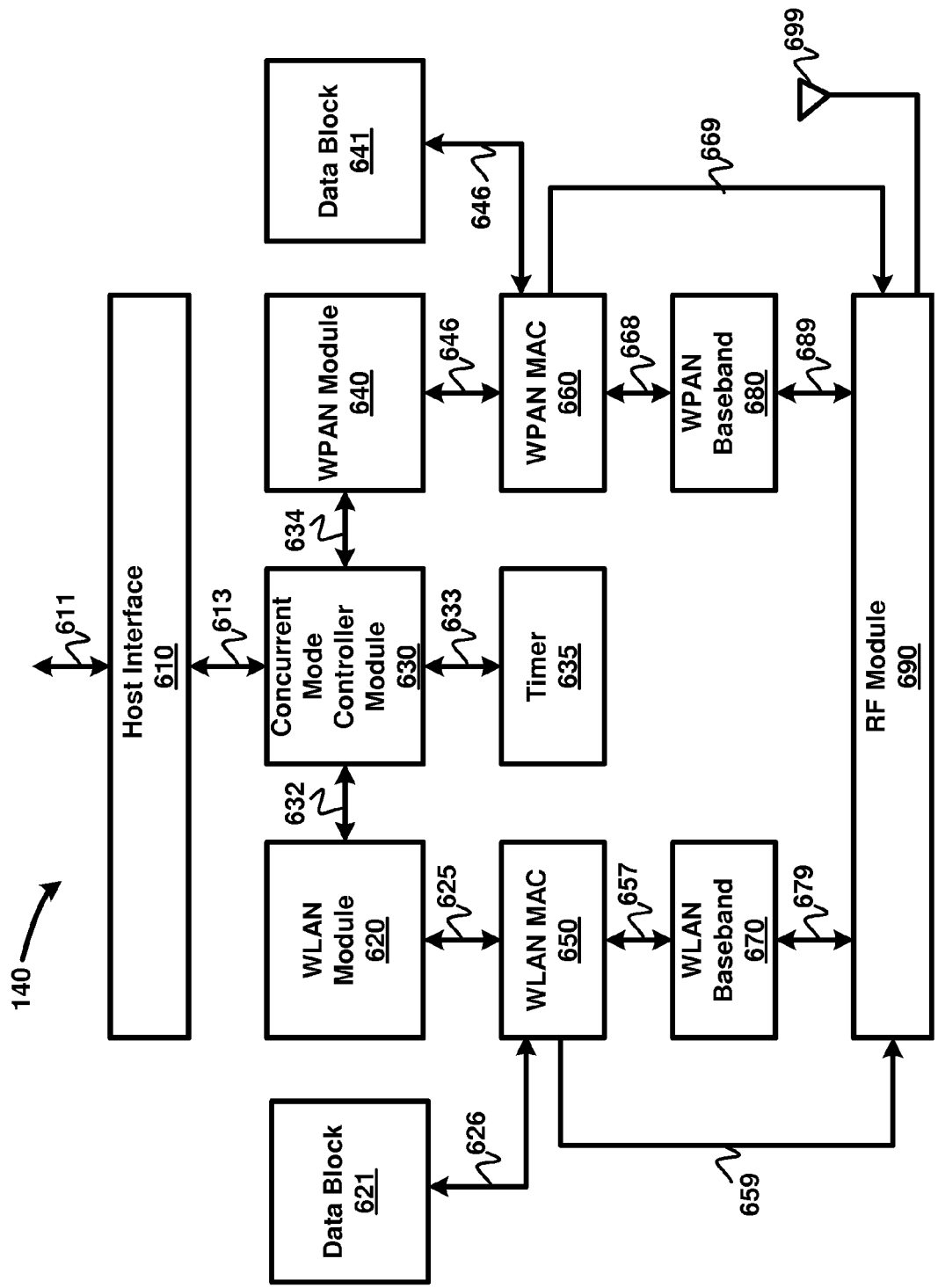
FIG. 6 is a diagram illustrating block-level implementation details of a wireless device, in an embodiment.

FIG. 6 is a diagram illustrating block-level implementation details of a wireless device, in an embodiment. Wireless device 140 is shown containing host interface 610, WLAN module 620, WLAN MAC 650, WLAN baseband 670, WPAN module 640, WPAN MAC 660, WPAN baseband 680, RF module 690, antenna 699, concurrent mode controller module 630, timer 635, data block 621 and data block 641. The combination of modules 620, 650 and 670 is termed herein as "WLAN chain". The combination of modules 640, 660 and 680 is termed herein as "WPAN chain".

When wireless device 140 operates as AP 140, block 621 receives, from WLAN MAC 650 (on path 626), data packets transmitted to AP 140 from a WLAN station (e.g., one of stations 110A-110C). Block 621 determines the target address to which the data packets are destined, and forwards the data packets with the corresponding address (of the other corresponding one of stations 110A-110C or some other device in wired network 150) back to WLAN MAC 620 (on path 626). When operating as AP 140, block 621 also generates/forms the data (or message bits) representing WLAN beacons transmitted by WLAN chain. When wireless device 140 operates as station 140, block 621 may represent an application which may generate data for transmission via WLAN MAC 650, and be the consumer of data received via WLAN MAC 650.

Data block 641 generates data (or message bits) to be transmitted by coordinator 140 in IEEE 802.15.4 beacons, and forwards the data to WPAN MAC 660 (on path 646). In addition, data block 641 receives, from WPAN MAC 660 (on path 646), data packets transmitted to coordinator 140 from a WPAN node (e.g., one of nodes 120A-120C). Data block 641 determines the target node to which the data packets are destined, and forwards the data packets (via WPAN MAC 660) with the corresponding address of the other corresponding one of nodes 120A-120C (or some other device in wired network 150. It is noted here that data can also be transferred between WPAN block 185 and WLAN BSS 180.

WLAN module 620 computes the parameters to be used when wireless device 140 transmits or receives signals according to WLAN (IEEE 802.11) standards. WLAN module 620 provides the value of the parameters to WLAN MAC 650 on path 625. The specific values of the parameters may be fixed, or be variable/configurable based on user inputs (provided via host interface 610, described below). The parameters may include the WLAN beacon interval to be used by AP 140, the length of power-ON durations of station 140, etc. Thus, for example, WLAN module 620 may provide to WLAN MAC 650, the length of WLAN beacon interval (t41-t42, or t43-t44, or t45-t46 in FIG. 2) when wireless device 140 operates as AP 140, and the power-ON period (t51-t57 or t51-t523) when wireless device 140 operates as station 140. Other parameters may include the security keys to be used for encryption and decryption of data sent to or received from external devices (other AP or stations depending on whether wireless device 140 is operating as a WLAN station or AP), BSSID (Basic Service Set Identifier), etc. In an embodiment, WLAN module 620 is implemented as corresponding software instructions executed by one or more processors.

WLAN MAC 650 performs medium access control operations to enable transmission and reception of data according to WLAN IEEE 802.11 specification. WLAN MAC 650 forms data frames (the data may be obtained in the manner described above with respect to block 621) and other frames (e.g., management frames) according to WLAN standards, and conforming to the parameters received from WLAN module 620. The frames may include addressing information of the target device to which the frames are intended. In an embodiment, WLAN MAC 650 is implemented using a combination of software instructions and hardware blocks (primarily registers and queues). The software instructions form the data/management frames noted above, and store the frames in corresponding hardware queues contained in WLAN MAC 650. The software portion of WLAN MAC 650 also program the corresponding registers to effect channel access control mechanisms according to IEEE 802.11. On obtaining access to the WLAN channel (which is a wireless medium), WLAN MAC 650 forwards the corresponding frame(s) to WLAN baseband 670 on path 657. WLAN MAC 620 may operate correspondingly to process data received, via WLAN baseband 670, on the WLAN channel from external devices/systems (e.g., AP 190 of FIG. 1), and forward the data to block 621, and the description is not provided in detail in the interest of conciseness.

WLAN baseband 670 receives the data bits (or symbols) of frames from WLAN MAC 650, and modulates a carrier signal with the data bits/symbols. The modulated carrier signal represents a baseband signal (first baseband signal) according to IEEE 802.11 standard, and WLAN baseband 670 forwards the baseband signal to RF module 690. When receiving data from external systems, WLAN baseband 670 extracts data bits/symbols from a modulated carrier received via RF module 590, and forwards the data bits/symbols to WLAN MAC 650 for further processing.

WPAN module 640 computes the parameters to be used when wireless device 140 operates as a coordinator according to WPAN (IEEE 802.15.4) standards. WPAN module 640 provides the value of the parameters to WPAN MAC 660 on path 646. The parameters include the IEEE 802.15.4 beacon interval to be used by the coordinator, the length of the contention access period (CAP, t31-t32 in FIG. 3), the length of the contention free period (CFP, t32-t33). Various other parameters as applicable or required by the IEEE 802.15.4 standard may also be computed by WPAN module 640. In an embodiment, WPAN module 620 is implemented as corresponding software instructions.

WPAN MAC 660 performs medium access control operations to enable transmission and reception of data according to WPAN IEEE 802.15.4 specification. Accordingly, WPAN MAC 660 forms data representing IEEE 802.15.4 beacons (the data may be obtained in the manner described above with respect to block 641), and in conformance with the parameters received from WPAN module 640. In an embodiment, WPAN MAC 660 is implemented using a combination of software instructions and hardware blocks (primarily registers and queues). The software instructions form the beacons noted above, and store the data representing the beacons in corresponding hardware queues contained in WPAN MAC 660. The software instructions also program the corresponding registers to effect channel access control mechanisms according to WPAN. On obtaining access to the WPAN channel (which is also a wireless medium), WPAN MAC 660 forwards the corresponding beacons to WPAN baseband 680 on path 668. WPAN MAC 620 may operate correspondingly to process data received, via WPAN baseband 680, on the WPAN channel from external devices/systems (e.g., WPAN nodes 120A-120C of FIG. 1), and forward the data to block 641, and the corresponding description is not provided in the interest of conciseness.

WPAN baseband 680 receives data bits (or symbols) from WPAN MAC 660, and modulates a carrier signal with the data bits/symbols. The modulated carrier signal represents a baseband signal (second baseband signal) according to IEEE 802.15.4 standard. WPAN baseband 680 forwards the baseband signal to RF module 690. When receiving data bits/symbols from WPAN nodes (120A-120C of FIG. 1), WPAN baseband 680 extracts the data bits/symbols from a modulated carrier received via RF module 590, and forwards the data bits/symbols to WPAN MAC 660 for further processing.

RF module 690 is shared by the blocks corresponding to WLAN and WPAN in a time-multiplexed manner, as described above with respect to FIGS. 3-5. Though not shown, RF module 690 contains frequency up-converters and frequency down-converters. The up-converters translate the carrier frequency of the baseband signal (the corresponding one of signals received on paths 679 and 689) to a higher frequency as specified by the corresponding specification (WLAN or WPAN). The up-converted signal is transmitted to a wireless medium via antenna 699. The down-converters receive a WPAN or a WLAN signal via antenna 699, and translate the signal to the corresponding lower (baseband) frequency, and provide the baseband signal on the corresponding one of paths 679 and 689. RF module 690 receives a control signal on path 659 to set the carrier frequency of the up-converted signal for WLAN transmission/reception. RF module 690 receives a control signal on path 669 to set the carrier frequency of the up-converted signal for WPAN transmission/reception. Thus, RF module 690 receives baseband signals according to WLAN on path 679, and transmits a corresponding up-converted signal (first up-converted signal) on the wireless medium via antenna 699. Similarly, RF module 690 receives baseband signals according to WPAN on path 689, and transmits a corresponding up-converted signal (second up-converted signal) on the wireless medium via antenna 699.

The specific up-converted frequency (i.e., transmit and receive frequency at antenna 699) when operating as a WLAN device may be selected from one of the bands allocated for WLAN, namely the 2.4 Giga Hertz (GHz), 3.6 GHZ, 5 GHz and 60 GHz frequency bands. The specific up-converted frequency (i.e., transmit and receive frequency at antenna 699) when operating as a WPAN device may be selected from one of the bands allocated for WPAN, namely 868.0-868.6 MHz band, 902-928 MHz band and 2400-2483.5 MHz band. The up-converters noted above may be implemented using local oscillators, mixers, low-pass filters and power amplifiers, as is well known in the relevant arts. The down-converters noted above may be implemented include low-noise amplifiers, local oscillators, mixers, and low-pass filters, as is also known in the relevant arts. The control signals on paths 659 and 669 may be used to control the corresponding local oscillator frequencies to obtain the desired final carrier frequencies.

Timer 635 represents one or more hardware timers, which is/are programmable to generate one or more interrupts (on path 633) on, for example, expiry of corresponding count values written to it/them.

Concurrent mode controller module 630 schedules the WLAN chain and WPAN chain to operate in a multiplexed manner (in non-overlapping intervals, as described above with respect to FIGS. 3-5) to enable wireless device 140 to operate both as a WLAN device and a WPAN coordinator, as described in detail above. Concurrent mode controller module 630 may program timer 635 with corresponding count values to generate interrupts, based on which switching of operation of wireless device 140 as a WPAN coordinator and a WLAN device occurs.

Thus, with respect to FIG. 3, concurrent mode controller module 630 may program timer 635 to generate an interrupt at t30. In response, concurrent mode controller module 630 either restores the data structures and register values representing the previously saved context of WPAN chain or initializes the context (if commencing operation after a power ON of wireless device 140). Concurrent mode controller module 630 programs timer 635 to generate an interrupt at t33. In interval t31-t33, wireless device 140 operates as a coordinator as described in detail above.

At t33, timer 635 generates an interrupt (as earlier programmed). In response, concurrent mode controller module 630 suspends the operation of WPAN chain (for example by writing into corresponding registers in WPAN MAC 660), and saves/store the context of the WLPN chain (data structures, register values, etc.) for later restoration. Following the context store of the WPAN chain, concurrent mode controller module 630 either restores the data structures and register values representing the previously saved context (data structures, register values, etc.) of WLAN chain or initializes the context (if commencing operation after a power ON of wireless device 140). Concurrent mode controller module 630 programs timer 635 to generate an interrupt at t34. In interval t33-t34, wireless device 140 operates as a WLAN device as described in detail above. At t34, concurrent mode controller module 630 saves the context of the WLAN chain and restores the context of the WPAN chain, and the multiplexed operations as a coordinator and WLAN device is repeated. The context of WLAN chain is retrieved and restored via path 632. The context of WPAN chain is retrieved and restored via path 634.

Host interface 610 provides electrical and protocol interfaces to enable connection of wireless device 140 with an external device/system. The external system could, for example, be a computer. A user may provide configuration information to wireless device 140 via the computer. The configuration information may include the parameters noted above with respect to WLAN module 620 and WPAN module 640. In operating as a WLAN station, the specific AP (e.g., AP 190) with which station 140 is to associate may also be specified by a user via the computer or external device/system in general.

It should be further appreciated that a wireless device can be enabled with the features described above as a desired combination of one or more of hardware, executable modules, and firmware. The description is continued with respect to an alternative view of the details of FIG. 6.

6. Digital Processing System

Figure 7:
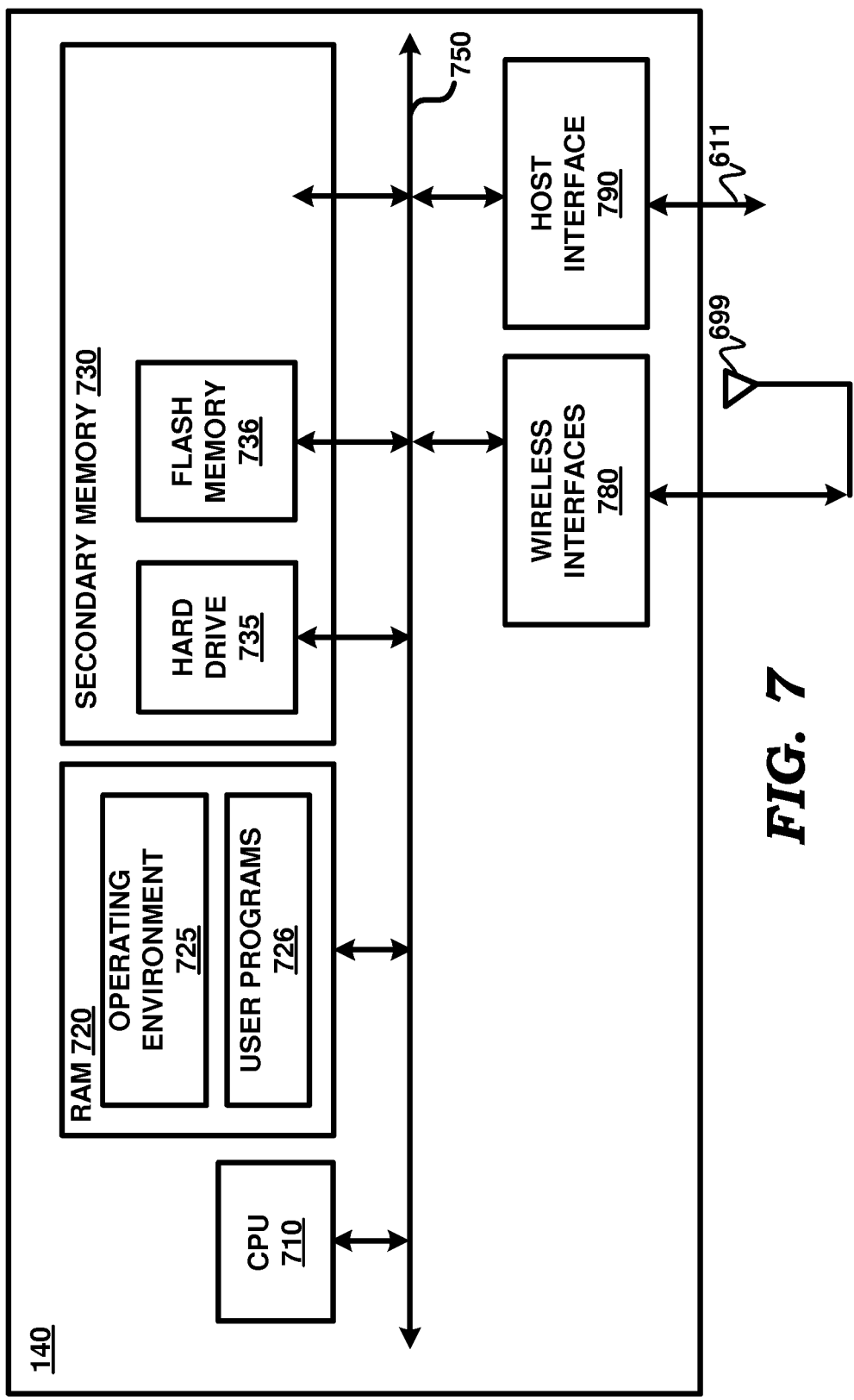
FIG. 7 is a block diagram illustrating the details of a wireless device in an alternative view.

FIG. 7 is a block diagram illustrating the details of wireless device 140 in an alternative view. Wireless device 140 may contain one or more processors such as a central processing unit (CPU) 710, random access memory (RAM) 720, secondary memory 730, wireless interfaces 780 and host interface 790. All the components may communicate with each other over communication path 750, which may contain several buses as is well known in the relevant arts.

CPU 710 may execute instructions stored in RAM 720 to provide several features of the present disclosure. CPU 710 may contain multiple processing units, with each processing unit potentially being designed for a specific task. Alternatively, CPU 710 may contain only a single general-purpose processing unit.

RAM 720 may receive instructions from secondary memory 730 (non-transitory/non-volatile machine readable medium) via communication path 750. RAM 720 is shown currently containing software instructions constituting operating environment 725 and/or other code/programs 726. In addition to operating system 725, RAM 720 may contain other software programs such as device drivers, etc., which provide a (common) run time environment for execution of code/programs/ applications (in the form of execution entities).

Secondary memory 730 is shown containing hard drive 735 and flash memory 736. Secondary memory 730 stores data and software instructions (code), which enable wireless device 140 to provide several features in accordance with the present disclosure. Thus, secondary memory 730 may store software instructions representing modules 620, 621, 630, 640, 641 and the corresponding software portions of modules 650 and 660 of FIG. 6. The software instructions (and additionally configuration data) may either be copied to RAM 720 prior to execution by CPU 710, or may be executed directly from flash memory 736.

Host interface 790 corresponds to host interface 610 of FIG. 6. Wireless interface 780 represents the combination of modules 670, 680, 690 and the hardware portions of modules 650 and 660.

It may thus be appreciated that the embodiments described above take advantage of idle durations in beacon intervals of IEEE 802.15.4 standard to operate in accordance with IEEE 802.11 WLAN standard. It should be appreciated that IEEE 802.15.4 merely represents an example protocol specification, which provides such an idle duration, and features of the present invention can be implemented in the context of other protocols that similarly provide periodic idle durations (according to protocol specification). It should be similarly appreciated that wireless devices can operate in accordance with protocols other than 802.11 WLAN standards in such idle durations. The example embodiments described above are thus merely examples.

7. Conclusion

References throughout this specification to "one embodiment", "an embodiment", or similar language means that a particular feature, structure, or characteristic described in connection with the embodiment is included in at least one embodiment of the present invention. Thus, appearances of the phrases "in one embodiment", "in an embodiment" and similar language throughout this specification may, but do not necessarily, all refer to the same embodiment.

While various embodiments of the present invention have been described above, it should be understood that they have been presented by way of example only, and not limitation. Thus, the breadth and scope of the present invention should not be limited by any of the above-described embodiments, but should be defined only in accordance with the following claims and their equivalents.

What is claimed is:

1. A wireless device comprising:
   a first set of modules enabled to generate a first baseband signal according to IEEE 802.11 standard, said first baseband signal being modulated to represent a first sequence of data bits;
   a second set of modules enabled to generate a second baseband signal according to IEEE 802.15.4 standard, said second baseband signal being modulated to represent a second sequence of data bits; and
   a common RF module enabled to up-convert each of said first baseband signal and said second baseband signal to generate a first up-converted signal and a second up-converted signal respectively, said common RF module being enabled to transmit said first up-converted signal and said second up-converted signal on a wireless medium,
   said wireless device operating as an access point (AP) according to said IEEE 802.11 standard in transmitting said first up-converted signal, and as an IEEE 802.15.4 coordinator in transmitting said second up-converted signal.

2. The wireless device of claim 1, further comprising a concurrent mode controller, which causes said common RF module to transmit said first up-converted signal and said second up-converted signal in non-overlapping durations.

3. The wireless device of claim 2, wherein said IEEE 802.15.4 standard specifies a beacon interval representing a duration between successive beacons, said each duration further contains an active duration and an idle duration, wherein said second up-converted signal is transmitted in said active duration and said first up-converted signal is transmitted in said idle duration.

4. The wireless device of claim 3, wherein said wireless device operates as said IEEE 802.15.4 coordinator in said active duration, and operates as said AP according to said 802.11 standard in said idle duration.

5. The wireless device of claim 3, wherein said beacon interval is programmable, and said active duration is less than hundred milliseconds.

6. The wireless device of claim 3, wherein said active duration is fifty milliseconds, and said idle duration is four hundred and fifty milliseconds.

7. A method performed in a wireless device, said method comprising:
   operating said wireless device as a WPAN coordinator device according to IEEE 802.15.4 during a first set of durations; and
   operating said wireless device as an access point according to IEEE 802.11 standard during a second set of durations.

8. The method of claim 7, wherein said IEEE 802.15.4 standard specifies a beacon interval representing a duration between successive beacons, said each duration further contains an active duration and an idle duration,
wherein said first set of durations are contained in said active duration and said second set of durations are contained in said idle duration.

9. The method of claim 8, wherein said active duration is less than hundred milliseconds.

10. The method of claim 9, wherein said active duration is fifty milliseconds, and said idle duration is four hundred and fifty milliseconds.

11. A non-transitory machine readable medium storing one or more sequences of instructions for operating a wireless device, wherein execution of said one or more sequences of instructions by one or more processors contained in said wireless device causes said wireless device to perform the actions of:
operating as a coordinator according to a first protocol specification in active durations specified by said first protocol; and
operating as an access point (AP) according to a second protocol specification in idle durations specified by said first protocol,
wherein said first protocol specification is IEEE 802.15.4 and said second protocol specification is IEEE 802.11.

12. The non-transitory machine readable medium of claim 11, wherein individual ones of said active durations are comprised in successive beacon intervals according to said first protocol, and individual ones of idle durations are also comprised in the corresponding successive beacon intervals.

13. The non-transitory machine readable medium of claim 11, wherein said first set of durations are interspersed with said second set of durations and wherein none of said first set of durations overlaps with any of said second set of durations.

14. The method of claim 7, wherein said first set of durations are interspersed with said second set of durations and wherein none of said first set of durations overlap with any of said second set of durations.

* * * * *